United States Patent
Hori et al.

(10) Patent No.: US 10,402,248 B2
(45) Date of Patent: Sep. 3, 2019

(54) METHOD FOR CONTROLLING ERROR RATE OF DEVICE-SPECIFIC INFORMATION AND PROGRAM FOR CONTROLLING ERROR RATE OF DEVICE-SPECIFIC INFORMATION

(71) Applicant: National Institute of Advanced Industrial Science and Technology, Tokyo (JP)

(72) Inventors: Yohei Hori, Tsukuba (JP); Kazukuni Kobara, Tsukuba (JP); Toshihiro Katashita, Tsukuba (JP); Toshihiro Matsui, Tsukuba (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 143 days.

(21) Appl. No.: 15/507,105

(22) PCT Filed: Aug. 20, 2015

(86) PCT No.: PCT/JP2015/073433
§ 371 (c)(1),
(2) Date: Feb. 27, 2017

(87) PCT Pub. No.: WO2016/031682
PCT Pub. Date: Mar. 3, 2016

(65) Prior Publication Data
US 2017/0255503 A1   Sep. 7, 2017

(30) Foreign Application Priority Data
Aug. 29, 2014   (JP) ................................. 2014-175824

(51) Int. Cl.
*G06F 11/00*   (2006.01)
*G06F 11/07*   (2006.01)
(Continued)

(52) U.S. Cl.
CPC .......... *G06F 11/076* (2013.01); *G06F 11/079* (2013.01); *G06F 11/0736* (2013.01);
(Continued)

(58) Field of Classification Search
CPC .. G06F 11/076; G06F 11/0736; G06F 11/079; H03K 19/003; H04L 9/10; H04L 9/32; G09C 1/00
See application file for complete search history.

(56) References Cited

U.S. PATENT DOCUMENTS

2009/0217045 A1   8/2009  Skoric et al.
2011/0066670 A1   3/2011  Yu
(Continued)

FOREIGN PATENT DOCUMENTS

EP   2 326 043 A1   5/2011
EP   2456121 A2   5/2012
(Continued)

OTHER PUBLICATIONS

Supplementary European Search Report for Serial No. EP 15 83 5986 dated Mar. 1, 2018.
(Continued)

*Primary Examiner* — Joseph D Manoskey
(74) *Attorney, Agent, or Firm* — McCormick, Paulding & Huber LLP

(57) ABSTRACT

A method and a program capable of controlling an error rate of device-specific information are provided. Provided is the method for controlling an error rate of device-specific information, including a step S1 of: inputting each of i (i is an arbitrary natural number) challenges, j times (j is an arbitrary natural number), into a PUF mounted chip; leaving j responses intact (j'=j) or processing j responses into j' pieces (0<j'<j); and registering them in the database beforehand in (Continued)

association with each piece of the input data, a step S2 of inputting i challenges into the database, a step S3 of: reading j' responses corresponding to the respective i challenges from the database; concatenating the j' responses for each piece of the input data; further concatenating the concatenated data by k' repetitions ($0<k'\leq k$, and k is an arbitrary natural number, but is a natural number of 2 or more if the i and the j are both 1); obtaining the concatenated (j'×k') responses for each piece of the input data; and further concatenating them also for different input data to obtain concatenated (i×j'×k') responses and thereby generate reference data, a step S4 of: inputting i challenges, k times, for each challenge into the PUF mounted chip; leaving obtained k responses intact as k'=k or processing the obtained k responses into k' pieces ($0<k'<k$); concatenating obtained k' responses by j' repetitions for each response; further concatenating them for all of the k' responses; further concatenating concatenated (j'×k') responses also for different input data; and obtaining concatenated (i×j'×k') responses to generate synthesized output data, and a step S5 of deciding whether or not the synthesized output data matches the reference data (specifically, whether a Hamming distance between both data is a threshold value or less), and the method determines whether or not the error rate of the synthesized output data is within a preset range based on the decision result in step S5, and changes at least one of i, j, j', k, and k' to repeat steps S1 to S5 until the error rate falls within the preset range if the error rate is determined not to be within the preset range.

8 Claims, 7 Drawing Sheets

(51) Int. Cl.
| | |
|---|---|
| *G09C 1/00* | (2006.01) |
| *H04L 9/10* | (2006.01) |
| *H04L 9/32* | (2006.01) |
| *H03K 19/003* | (2006.01) |

(52) U.S. Cl.
CPC .............. *G09C 1/00* (2013.01); *H03K 19/003* (2013.01); *H04L 9/10* (2013.01); *H04L 9/32* (2013.01)

(56) References Cited

U.S. PATENT DOCUMENTS

| | | | |
|---|---|---|---|
| 2014/0201851 A1 | 7/2014 | Guo et al. | |
| 2015/0092939 A1* | 4/2015 | Gotze | H04L 9/34 380/2 |
| 2015/0347216 A1* | 12/2015 | Kim | G06F 11/079 714/824 |
| 2016/0182045 A1* | 6/2016 | Mai | G09C 1/00 326/8 |

FOREIGN PATENT DOCUMENTS

| | | |
|---|---|---|
| EP | 2191410 B1 | 10/2014 |
| JP | 2008-543060 A | 11/2008 |
| JP | 2009-517910 A | 4/2009 |

OTHER PUBLICATIONS

International Search Report for PCT Serial No. PCT/JP2015/073433 dated Oct. 16, 2015.
Rostami et al., "Robust and Reverse-Engineering Resilient PUF Authentication and Key-Exchange by Substring Matching," IEEE, vol. 2, No. 1 (Mar. 2014).

* cited by examiner

METHOD FOR CONTROLLING ERROR RATE OF DEVICE-SPECIFIC INFORMATION AND PROGRAM FOR CONTROLLING ERROR RATE OF DEVICE-SPECIFIC INFORMATION

CROSS-REFERENCE TO RELATED APPLICATIONS

This application is a National Stage application of International Patent Application No. PCT/JP2015/073433, filed on Aug. 20, 2015, which claims priority to Japanese Patent Application Number 2014-175824, filed on Aug. 29, 2014, each of which is hereby incorporated by reference in its entirety.

TECHNICAL FIELD

The present invention relates to a technology for controlling an error rate of device-specific information.

BACKGROUND ART

Up to now, various device authentication technologies using a Physically Unclonable Function (PUF) have been devised, and for example, the following Japanese Patent Application Laid-open No. 2009-517910 discloses an authentication method using challenges/responses on a plurality of physical tokens.

In addition, Japanese Patent Application Laid-open No. 2008-543060 discloses a method of performing authentication by storing the aged deterioration information of the PUF together.

SUMMARY

The PUF is promising as a technology for generating unclonable device-specific information (device ID). However, since output contains a lot of noise due to process variations, when the above specific information is generated by using the output of the PUF, a certain level of error rate occurs. Here, there is a problem that the smaller the error rate becomes, the larger required circuit scale and data size become.

In addition, the above error rate is generally set per targeted application and, about such an article that mistaking a false article for a real article is not permitted, for example, about a building entry/exit card and a military equipment component requiring high security, the error rate is required as small as possible even if a specific information generation procedure is complicated and the data size is large.

On the other hand, for example, about an article such as an entrance/exit card of an apartment, a slightly small value is sufficient to be set as the error rate.

Here, there is also a problem that manufacturing the PUF in accordance with the target error rate set for each application as described above is not realistic for an increase in manufacturing cost.

The present invention is made to solve the above problem, and has an object to provide a method and a program capable of controlling the error rate of device-specific information.

In order to solve the above problem, the present invention includes a first step of: inputting each of i (i is an arbitrary natural number) pieces of input data, j times (j is an arbitrary natural number), into a physically unclonable circuit; and leaving j responses intact (j'=j) or processing them into j' pieces (0<j'<j) (specifically, for example, j pieces are divided into j' subsets, and the most frequent value of values on each axis of the responses (if there are a plurality of most frequent values, any one of them) within each subset is set as the value on that axis of the response representing that subset) to store them in a storage means beforehand in association with each piece of the input data and an ID of the physically unclonable circuit, and the present invention inputs the ID of the physically unclonable circuit and the i pieces of the input data into the storage means, reads j' responses corresponding to the respective pieces of the input data from the storage means to concatenate them, and further concatenates the concatenated data by k' repetitions (0<k'≤k, and k is an arbitrary natural number) to obtain (j'×k') responses for each piece of the input data.

It should be noted that in the above, the "axis" means each component constituting the above response and, for example, in the response having three components, the "axis" includes the three axes of x-axis, y-axis, and z-axis (the same applies hereinafter).

Then, provided is a method for controlling an error rate of device-specific information including a second step of further concatenating them for i pieces of the input data to obtain (i×j'×k') responses and thereby generate reference data, a third step of: inputting each of the i pieces of input data, k times, into the physically unclonable circuit; leaving obtained k responses for each of the i pieces intact as k'=k or processing them into k' pieces (specifically, for example, k pieces are divided into k' subsets, and the most frequent value of values on each axis of the responses (if there are a plurality of most frequent values, any one of them) within each subset is set as the value on that axis of the response representing that subset); generating k' responses for each piece of the input data; concatenating each of the responses thereof by j' repetitions; further concatenating k' sets of j' responses to obtain (j'×k') responses; and further concatenating i sets of them to obtain (i×j'×k') responses and thereby generate synthesized output data, a fourth step of deciding whether or not the synthesized output data is in the same range as the reference data, and a fifth step of determining whether or not the error rate of the synthesized output data is within a preset range as a result of the decision in the fourth step, and the method changes at least one of i, j, j', k, and k' to repeat the first to fifth steps until the error rate falls within the preset range if the error rate is determined not to be within the preset range in the fifth step.

In addition, in order to solve the above problem, the present invention provides a method for controlling an error rate of device-specific information including a first step of initially setting input data into a physically unclonable circuit, a second step of: inputting each of i pieces (i is an arbitrary natural number) of initially set input data, j times (j is an arbitrary natural number), into the physically unclonable circuit; leaving j responses intact (j'=j) or processing them into j' pieces (0<j'<j) (specifically, for example, j pieces are divided into j' subsets, and the most frequent value of values on each axis of the responses (if there are a plurality of most frequent values, any one of them) within each subset is set as the value on that axis of the response representing that subset); and storing obtained j' responses for each piece of the input data in the storage means beforehand in association with the ID of the physically unclonable circuit and each piece of the input data for j' responses, a third step of: inputting the ID of the physically unclonable circuit and the i pieces of input data into the storage means; reading the j' responses corresponding to the respective pieces of the input data from the storage means to concatenate the j' responses for each piece of input data; and further concatenating the concatenated data by k' repetitions (where 0<k'≤k, and k is an arbitrary natural number) to further concatenate the obtained (j'×k') responses for each piece of the input data for i pieces of different input data and thereby generate reference data including obtained (i×j'×k') responses, a fourth step of: inputting each of i pieces of the input data, k times, into the physically unclonable circuit; leaving k responses for each piece of the obtained input data intact as k'=k or processing them into k' pieces (specifically, for example, k pieces are divided into k' subsets, and the most frequent value of values on each axis of the responses (if there are a plurality of most frequent values, any one of them) within each subset is set as the value on that axis of the response representing that subset); generating k' responses for each piece of the input data; concatenating each piece of the k' responses by j' repetitions; further concatenating k' sets of the obtained j' responses to obtain (j'×k') responses; and further concatenating i sets of them to generate obtained (i×j'×k') responses as synthesized output data, a fifth step of deciding whether or not the synthesized output data is in the same range as the reference data, and a sixth step of determining whether or not the error rate of the synthesized output data is within a preset range as a result of the decision in the fifth step, and the present invention changes the input data to repeat the first to sixth steps until the error rate falls within the preset range if the error rate is determined not to be within the preset range in the sixth step.

In addition, in order to solve the above problem, the present invention provides a program for controlling an error rate of device-specific information for causing a computer to perform a first procedure of: inputting each of i pieces (i is an arbitrary natural number) of input data, j times (j is an arbitrary natural number), into the physically unclonable circuit; leaving j responses intact (j'=j) or processing them into j' pieces (0<j'<j) (specifically, for example, j pieces are divided into j' subsets, and the most frequent value of values on each axis of the responses (if there are a plurality of most frequent values, any one of them) within each subset is set as the value on that axis of the response representing that subset); and storing obtained j' responses for each piece of the input data in the storage means beforehand in association with each piece of the input data and the ID of the physically unclonable circuit, a second procedure of: inputting the ID of the physically unclonable circuit and the i pieces of input data into the storage means; reading j' responses corresponding to the respective pieces of the input data from the storage means to concatenate j' responses for each piece of the input data; further concatenating the concatenated data by k' repetitions (where 0<k'≤k, and k is an arbitrary natural number); obtaining (j'×k') responses for each piece of the input data; and concatenating them for i pieces of different input data to generate synthesized output data including obtained (i×j'×k') responses, a third procedure of deciding whether or not the synthesized output data is in the same range as the reference data, and a fourth procedure of determining whether or not the error rate of the synthesized output data is within a preset range as a result of the decision in the third procedure, and the program changes at least one of i, j, j', k, and k' to repeat the first to fourth procedures until the error rate falls within the preset range if the error rate is determined not to be within the preset range in the fourth procedure.

In addition, in order to solve the above problem, the present invention provides a program for controlling an error rate of device-specific information for causing a computer to perform a first procedure of initially setting input data into a physically unclonable circuit, a second procedure of: inputting each of i pieces (i is an arbitrary natural number) of initially set input data, j times (j is an arbitrary natural number), into the physically unclonable circuit; leaving j responses intact (j'=j) or processing them into j' pieces (0<j'<j) (specifically, for example, j pieces are divided into j' subsets, and the most frequent value of values on each axis of the responses (if there are a plurality of most frequent values, any one of them) within each subset is set as the value on that axis of the response representing that subset); and storing obtained j' responses for each piece of input data in the storage means beforehand in association with an ID of the physically unclonable circuit and each piece of the input data, a third procedure of: inputting the ID of the physically unclonable circuit and the i pieces of input data into the storage means; reading j' responses corresponding to the respective i pieces of input data from the storage means to concatenate j' responses for each piece of the input data; further concatenating the concatenated data by k' repetitions (where 0<k'≤k, and k is an arbitrary natural number); obtaining (j'×k') responses for each piece of the input data; and concatenating them for different input data to generate synthesized output data including obtained (i×j'×k') responses, a fourth procedure of deciding whether or not the synthesized output data is in the same range as the reference data, and a fifth procedure of determining whether or not the error rate of the synthesized output data is within a preset range as a result of decision in the fourth procedure, and the program changes the input data to repeat the first to fifth procedures until the error rate falls within the preset range if the error rate is determined not to be within the preset range in the fifth procedure.

According to the present invention, the error rate of device-specific information can be controlled.

BRIEF DESCRIPTIONS OF THE DRAWINGS

DETAILED DESCRIPTION

Figure 1:
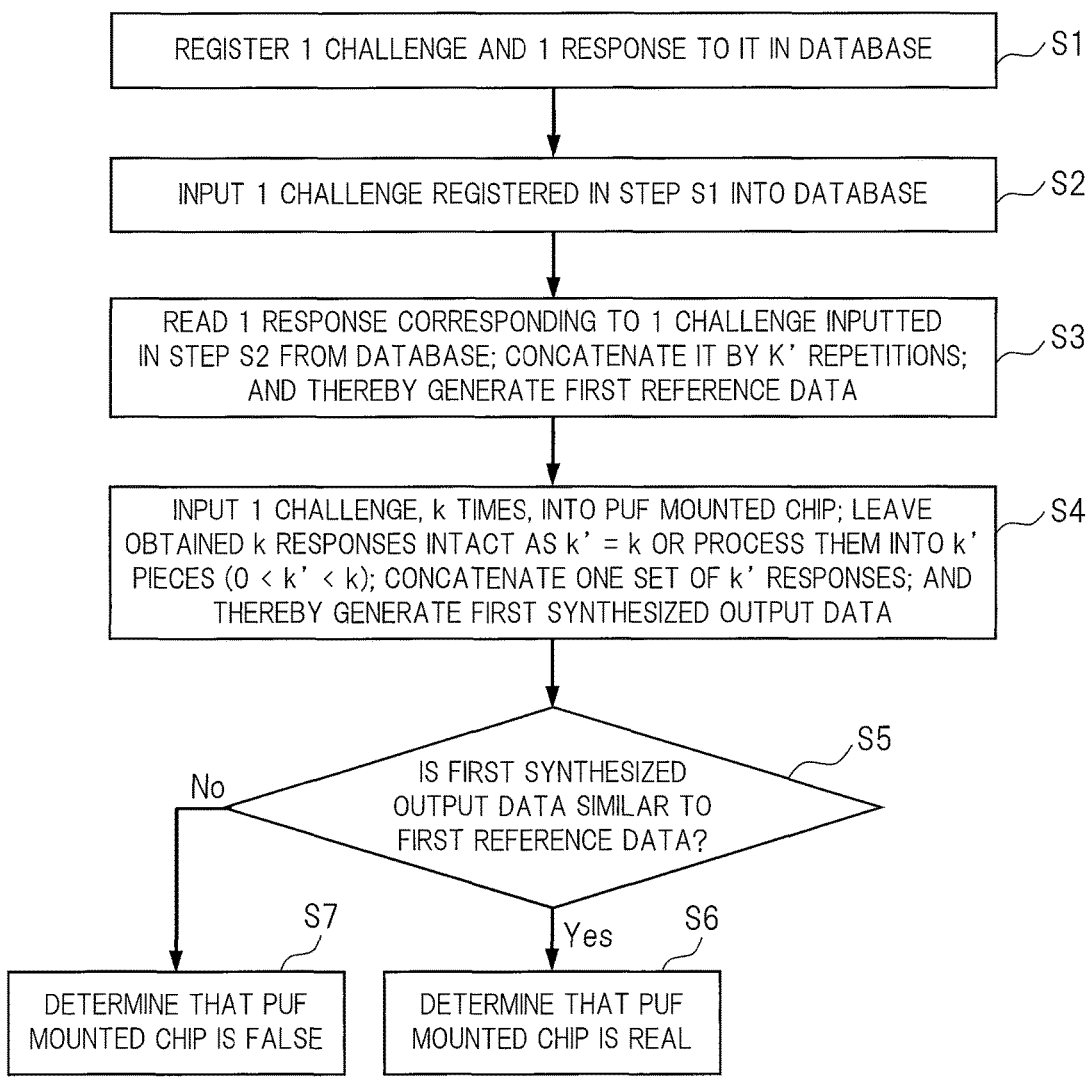
FIG. 1 is a flowchart showing an authenticity deciding method of a PUF mounted chip in a [1, 1, 1, k, k'] mode according to an embodiment of the present invention.

In the following, embodiments of the present invention will be described in detail with reference to the drawings. It should be noted that identical reference numerals in the drawings indicate identical or equivalent parts.

As a specific example of a method for controlling an error rate of device-specific information according to the present invention, an authenticity deciding method of a PUF mounted chip according to first to fourth embodiments will be described in detail.

First Embodiment

Figure 2:
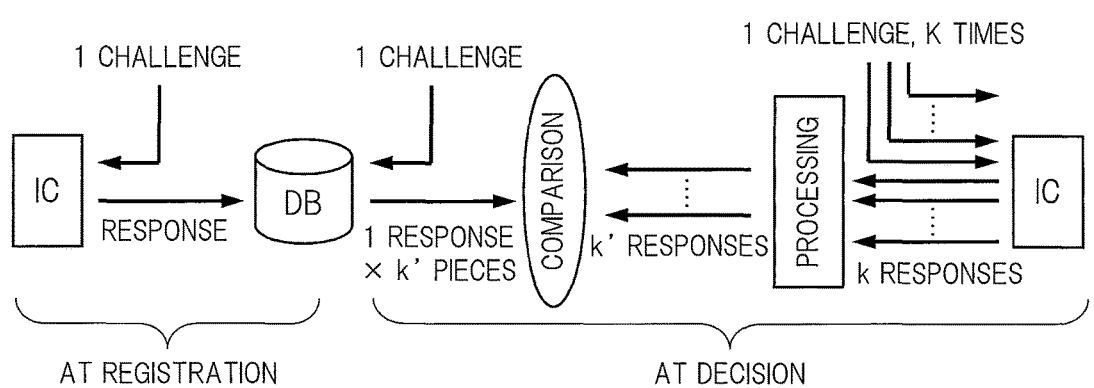
FIG. 2 is a diagram for explaining the authenticity deciding method shown in FIG. 1.

With reference to FIGS. 1 and 2, an authenticity deciding method of a PUF mounted chip in a [1, 1, 1, k, k'] mode according to a first embodiment will be described in detail.

Here, the PUF mounted chip means a semiconductor integrated circuit incorporating a PUF, and the same applies to the following.

In addition, a [1, 1, 1, k, k'] mode is one of the modes used in the authenticity decision of the PUF mounted chip (hereinafter also referred to as "usage mode") and, as shown in FIG. 2, means a mode of: inputting one piece of input data (challenge) into a PUF mounted chip IC; registering obtained one piece of output data (response) in a database DB; and using k responses (where k is a natural number of 2 or more in the present embodiment) from the PUF mounted chip IC at a time of authenticity decision.

It should be noted that the database DB may be another means for storing a response(s) outputted from the PUF mounted chip IC, such as a hard disk and a memory circuit, and the same applies to the following embodiments.

FIG. 1 is a flowchart showing the authenticity deciding method of the PUF mounted chip in the [1, 1, 1, k, k'] mode according to an embodiment of the present invention.

First, as shown in FIG. 2, step S1 includes inputting 1 challenge into the PUF mounted chip IC, and causing 1 response to the input to correspond to the inputted challenge and an ID of the PUF mounted chip IC and to register them in the database DB.

As a procedure at a time of decision, first, step S2 includes inputting the ID and the 1 challenge registered in step S1 into the database DB. It should be noted that temporarily inputting the ID registered in step S1 into the database DB may cause a list of challenges registered beforehand in association with the ID to be acquired from the database DB and the like, and may cause 1 challenge to be selected from the list and inputted into the DB.

Then, step S3 includes: reading 1 response corresponding to the 1 challenge inputted into step S2 from the database DB; and generating first reference data by concatenating it by k' repetitions.

Next, step S4 includes: inputting the above 1 challenge k times into the PUF mounted chip IC; leaving the obtained k responses intact as k'=k, or processing them into k' pieces (specifically, for example, k pieces are divided into k' subsets, and the most frequent value of values on each axis of the responses (if there are a plurality of most frequent values, any one of them) within each subset is set as the value on that axis of the response representing that subset); and generating first synthesized output data by concatenating one set of them.

It should be noted that the "axis" in the above means each component constituting the response and, for example, includes three axes of x-axis, y-axis, and z-axis if the response has three components (the same applies hereinafter).

Then, step S5 includes: deciding whether or not the first synthesized output data is similar to the first reference data (specifically, whether or not a Hamming distance between both data is equal to or smaller than a threshold value); proceeding to step S6 to judge that the PUF mounted chip IC is real if the similarity is decided; and proceeding to step S7 to judge that the PUF mounted chip IC is false if no similarity is decided.

According to the authenticity deciding method according to the first embodiment as described above, changing the values of k and k' allows the error rate in the decision in step S5 to be controlled.

In addition, since the data of the 1 response is sufficient to be registered in the database DB in this method, a size of the database DB can be reduced.

In addition, the first synthesized output data and the first reference data generated by the method as described above can also be used as a cryptographic key and original data for generating it.

Second Embodiment

Figure 3:
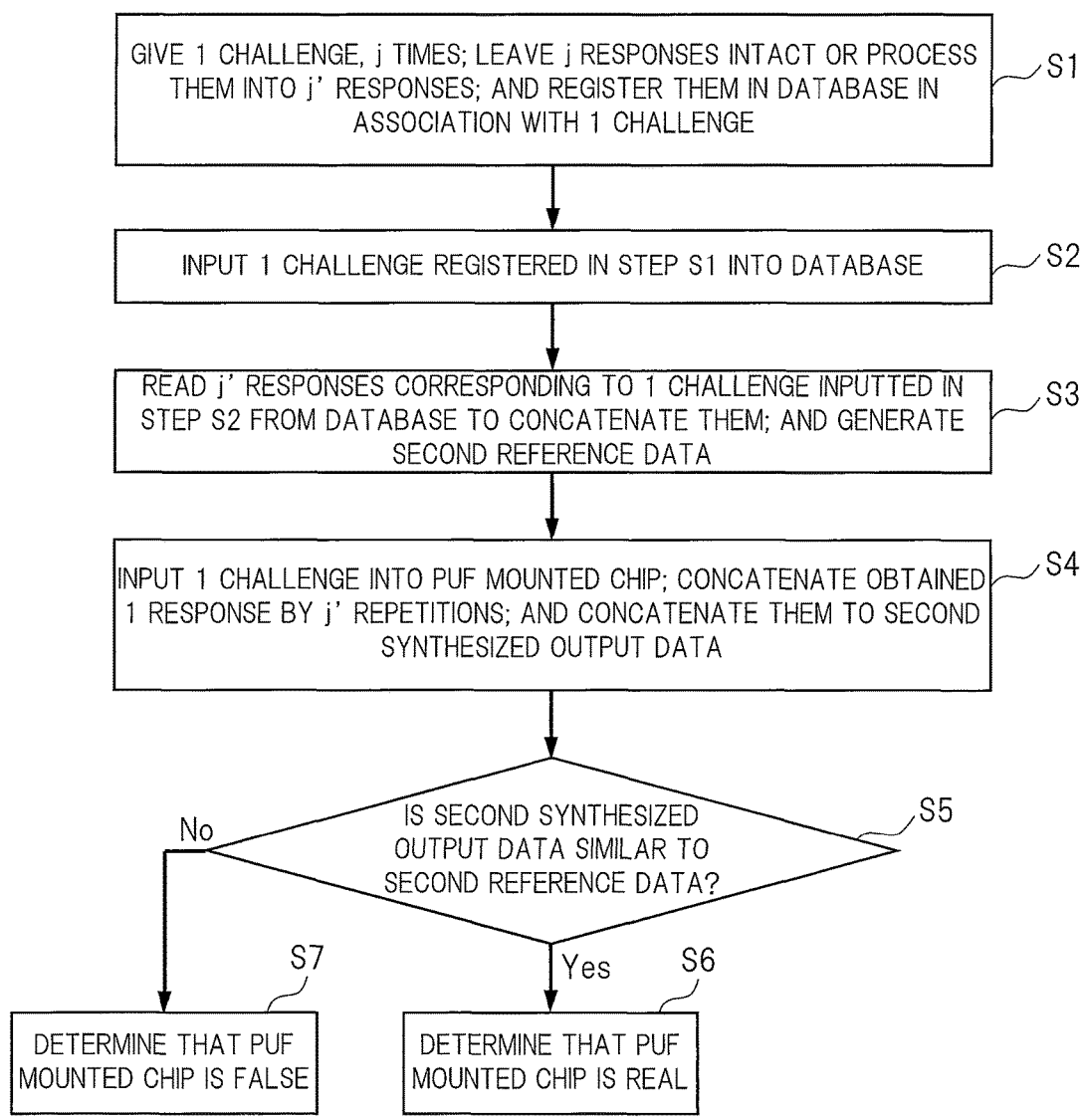
FIG. 3 is a flowchart showing an authenticity deciding method of a PUF mounted chip in a [1, j, j', 1, 1] mode according to an embodiment of the present invention.
Figure 4:
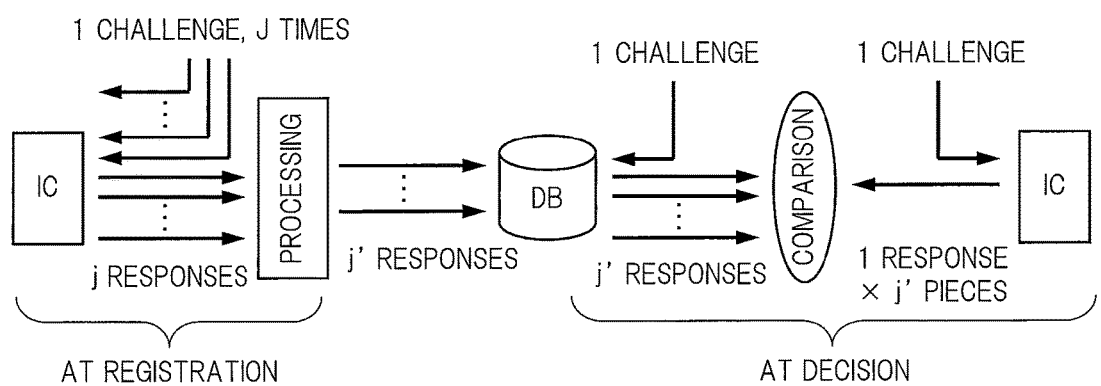
FIG. 4 is a diagram for explaining the authenticity deciding method shown in FIG. 3.

With reference to FIGS. 3 and 4, an authenticity deciding method of a PUF mounted chip in the [1, j, j', 1, 1] mode according to a second embodiment will be described in detail.

Here, as shown in FIG. 4, the [1, j, j', 1, 1] mode means a usage mode of: inputting one piece of identical input data (challenge) into the PUF mounted chip IC, j times (where j is a natural number of 2 or more in the present embodiment); leaving obtained j responses intact (j'=j) or processing them into j' pieces (0<j'<j) (specifically, for example, j pieces are divided into j' subsets, and the most frequent value of values on each axis of the responses (if there are a plurality of most frequent values, any one of them) within each subset is set as the value on that axis of the response representing that subset) to be registered in the database DB; and using the 1 response from the above PUF mounted chip IC at a time of authenticity decision.

FIG. 3 is a flowchart showing the authenticity deciding method of the PUF mounted chip in the [1, j, j', 1, 1] mode according to the embodiment of the present invention.

As shown in FIG. 4, first, step S1 includes: inputting one identical challenge, j times, into the PUF mounted chip IC; leaving j responses to the input intact (j'=j) or processing them into j' pieces (0<j'<j) (specifically, for example, j pieces are divided into j' subsets, and the most frequent value of values on each axis of the responses (if there are a plurality of most frequent values, any one of them) within each subset is set as the value on that axis of the response representing that subset); and registering them in the database DB in association with the inputted challenge and an ID of the PUF mounted chip IC.

In the following, as a procedure at the time of decision, first, step S2 includes inputting, into the database DB, the ID of the PUF mounted chip IC and the 1 challenge that are registered in step S1. It should be noted that the ID of the PUF mounted chip IC may be temporarily input into the DB, a list of challenges registered beforehand in association with the ID may be acquired from the database DB and the like, and the 1 challenge selected from the list may be inputted into the DB.

Then, step S3 includes: reading the j' responses corresponding to the 1 challenge inputted in step S2 from the database DB to concatenate them; and generating second reference data.

Then, step S4 includes: inputting the 1 challenge into the PUF mounted chip IC; and generating second synthesized output data by concatenating the obtained 1 response by j' repetitions.

Then, step S5 includes: deciding whether or not the second synthesized output data is similar to the second reference data (specifically, whether or not a Hamming distance between both data is equal to or smaller than a threshold value); and proceeding to step S6 to judge that the PUF mounted chip IC is real if the similarity is decided; and proceeding to step S7 to judge that the PUF mounted chip IC is false if no similarity is decided.

According to the authenticity deciding method according to the second embodiment as described above, changing the values of j and j' allows the error rate in the decision in step S5 to be controlled.

In addition, since authenticity decision can be performed simply by obtaining the 1 response from the PUF mounted chip IC at the time of decision, a time required for the decision can be shortened.

In addition, the second synthesized output data and the second reference data that are generated by the method as described above can also be used as a cryptographic key and original data for it.

It should be noted that, in the authenticity deciding method according to the second embodiment, it is necessary to register the j' responses in the database DB, but if such j' responses are compressed into information indicating mutually different parts to be stored in the database DB, the scale of the required database DB can be reduced.

Third Embodiment

Figure 5:
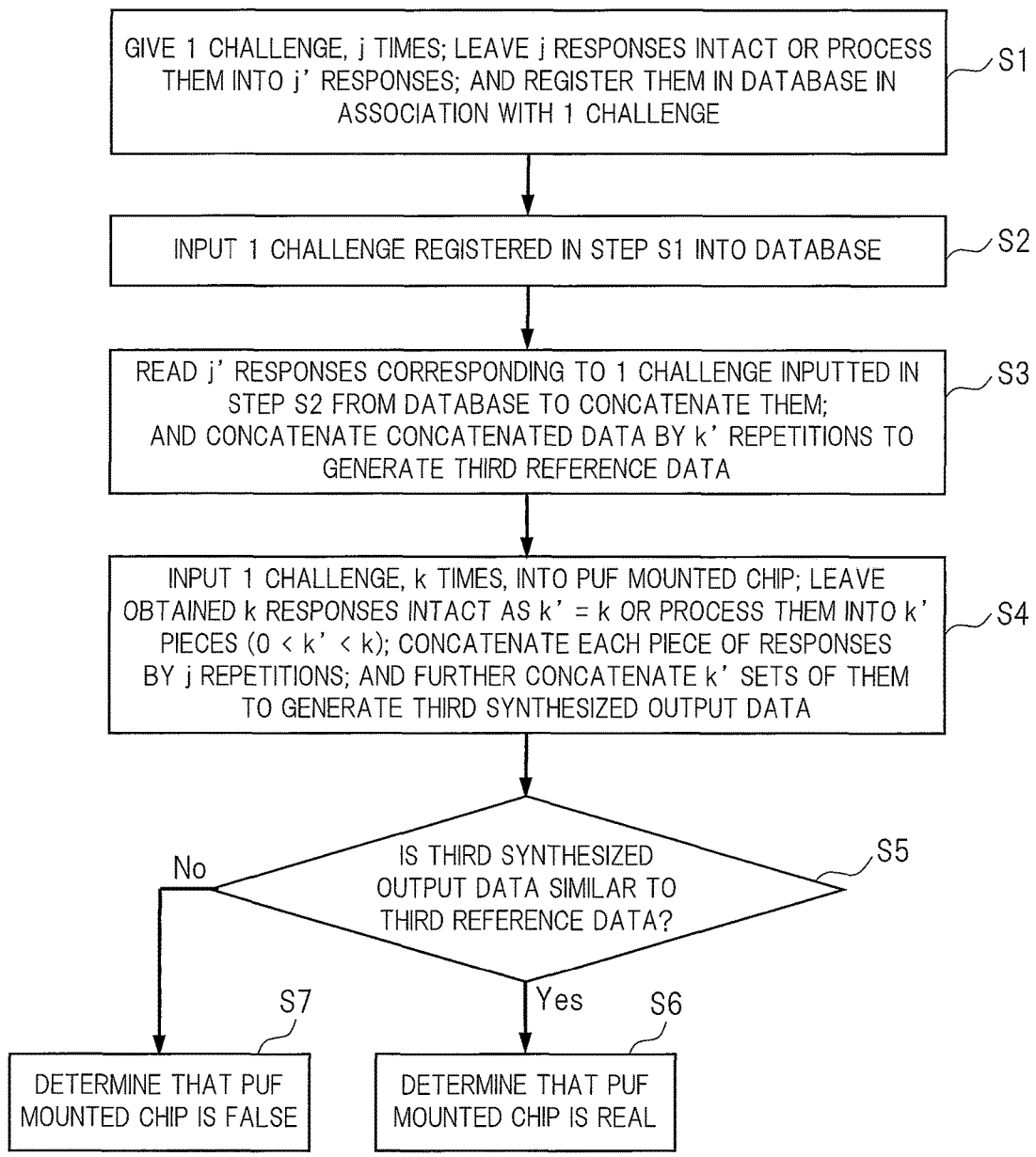
FIG. 5 is a flowchart showing an authenticity deciding method of a PUF mounted chip in a [1, j, j', k, k'] mode according to an embodiment of the present invention.

With reference to FIG. 5, an authenticity deciding method of a PUF mounted chip in a [1, j, j', k, k'] mode according to a third embodiment will be described in detail.

Here, the [1, j, j', k, k'] mode means a usage mode of: inputting one piece of identical input data (challenge) into the PUF mounted chip IC, j times (where j is a natural number of 2 or more in the present embodiment); leaving obtained j pieces of the response intact (j'=j) or processing them into j' pieces (0<j'<j) (specifically, for example, j pieces are divided into j' subsets, and the most frequent value of values on each axis of the responses (if there are a plurality of most frequent values, any one of them) within each subset is set as the value on that axis of the response representing that subset) to be registered in the database DB; and using k responses (where k is a natural number of 2 or more in the present embodiment) from the above PUF mounted chip IC at the time of authenticity decision.

FIG. 5 is a flowchart showing the authenticity deciding method of the PUF mounted chip in the [1, j, j', k, k'] mode according to the embodiment of the present invention.

First, step S1 includes: inputting one identical challenge, j times, into the PUF mounted chip IC; leaving j responses to the input intact (j'=j) or processing them into j' pieces (0<j'<j) (specifically, for example, j pieces are divided into j' subsets, and the most frequent value of values on each axis of the responses (if there are a plurality of most frequent values, any one of them) within each subset is set as the value on that axis of the response representing that subset); and registering them in the database DB in association with the inputted challenge and the ID of the PUF mounted chip IC.

In the following, as a procedure at the time of decision, first, step S2 includes inputting the ID of the PUF mounted chip IC and the 1 challenge registered in step S1 into the database DB. It should be noted that the ID of the PUF mounted chip IC may be temporarily inputted into the DB, a list of challenges registered beforehand in association with the ID may be acquired from the database DB and the like, and the 1 challenge from the list may be inputted into the DB.

Then, step S3 includes: reading j' responses corresponding to the 1 challenge inputted in step S2 from the database DB to concatenate them; and generating third reference data including (j'×k') responses by further concatenating the concatenated data by k' repetitions.

Next, step S4 includes: inputting the above 1 challenge, k times, into the PUF mounted chip IC; leaving the obtained k responses intact as k'=k or processing them into k' pieces (specifically, for example, k pieces are divided into k' subsets, and the most frequent value of values on each axis of the responses (if there are a plurality of most frequent values, any one of them) within each subset is set as the value on that axis of the response representing that subset) to concatenate each response of the obtained k' pieces by j' repetitions; and generating third synthesized output data including (k'×j') responses by further concatenating k' sets of them.

Then, step S5 includes: deciding whether or not the third synthesized output data is similar to the third reference data (specifically, whether or not a Hamming distance between both data is equal to or smaller than a threshold value); and proceeding to step S6 to judge that the PUF mounted chip IC is real if the similarity is decided; and proceeding to step S7 to judge that the PUF mounted chip IC is false if no similarity is decided.

According to the authenticity deciding method according to the third embodiment as described above, changing the values of j, j', k, and k' allows the error rate in the decision in step S5 to be controlled.

In the present method, since independently setting the j, j', k, and k' as four parameters allows the error rate to be changed, the error rate can be controlled with higher accuracy.

In addition, the third synthesized output data and the third reference data that are generated by the method as described above can also be used as a cryptographic key and the original data for generating it.

It should be noted that, in the authenticity deciding method according to the third embodiment, it is necessary to register the j' responses in the database DB, but if such j' responses are compressed into information indicating mutually different parts to be stored in the database DB, the scale of the required database DB can be reduced.

Fourth Embodiment

Figure 6:
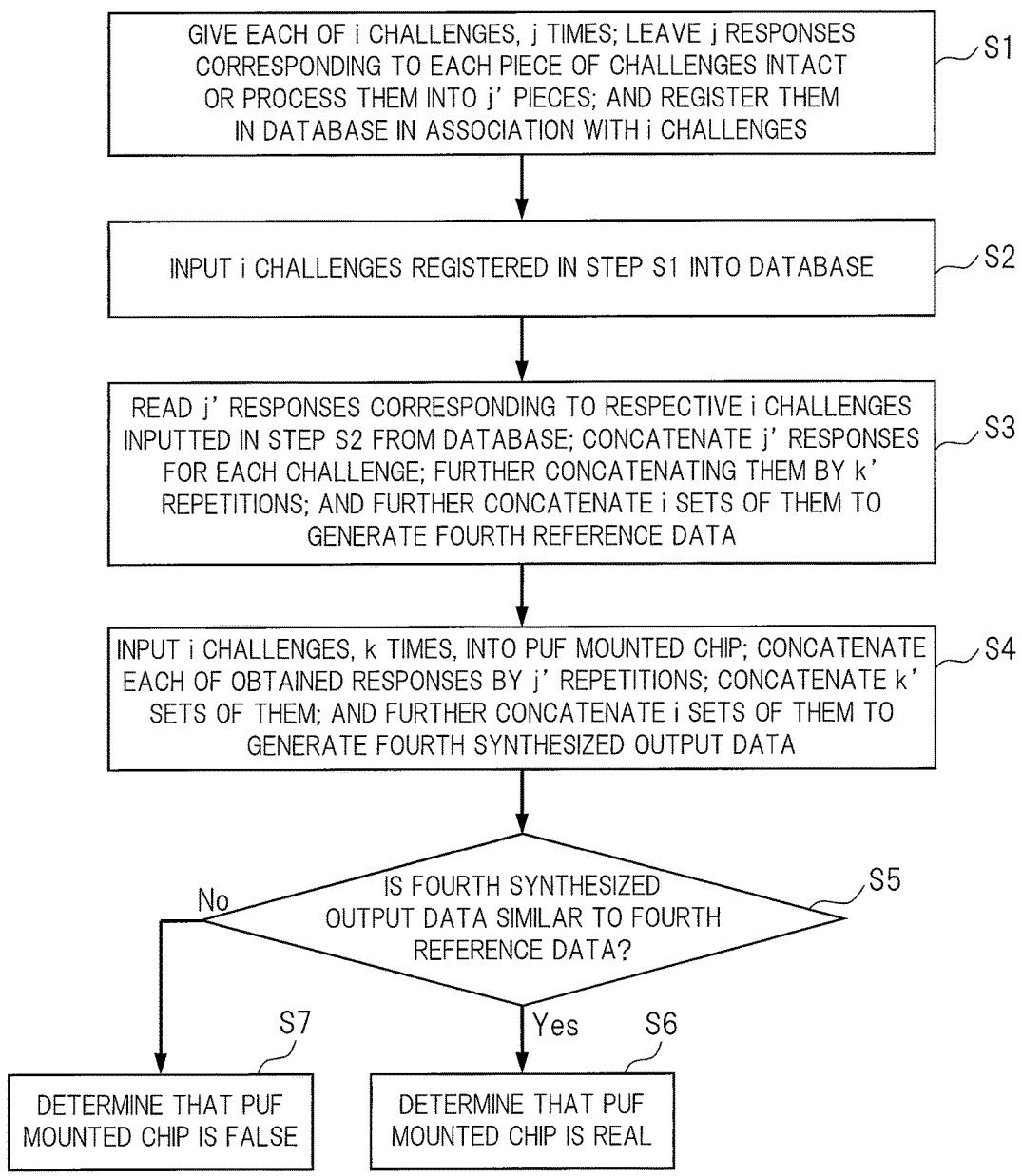
FIG. 6 is a flowchart showing an authenticity deciding method of a PUF mounted chip in a [i, j, j', k, k'] mode according to an embodiment of the present invention.

With reference to FIG. 6, an authenticity deciding method of a PUF mounted chip in a [i, j, j', k, k'] mode according to a fourth embodiment will be described in detail.

Here, the [i, j, j', k, k'] mode means a usage mode of: inputting each of i pieces (where i is a natural number of 2 or more in the present embodiment) of different input data (challenges), j times (where j is a natural number of 2 or more in the present embodiment), into the PUF mounted chip IC; leaving obtained j responses for each challenge intact (j'=j) or processing them into j' pieces (0<j'<j) (specifically, for example, j pieces are divided into j' subsets, and the most frequent value of values on each axis of the responses (if there are a plurality of most frequent values, any one of them) within each subset is set as the value on that axis of the response representing that subset) to be registered in the database DB; and using the k responses (k is a natural number of 2 or more in the present embodiment) from the above PUF mounted chip IC at the time of authenticity decision.

FIG. 6 is a flowchart showing the authenticity deciding method of the PUF mounted chip in the [i, j, j', k, k'] mode according to the embodiment of the present invention.

First, step S1 includes: inputting each of i different challenge, j times, into the PUF mounted chip IC; leaving j responses obtained for each piece of input data intact (j'=j) or processing them into j' pieces (0<j'<j) (specifically, for example, j pieces are divided into j' subsets, and the most frequent value of values on each axis of the responses (if there are a plurality of most frequent values, any one of them) within each subset is set as the value on that axis of the response representing that subset); and registering the obtained j' responses in the database DB in association with the inputted the i challenges and the ID of the PUF mounted chip IC.

In the following, as a procedure at the time of decision, first, step S2 includes inputting the ID and the i challenges registered in step S1 into the database DB. It should be noted that the ID may be temporarily inputted into the database DB, a list of challenges registered beforehand in association with the ID may be acquired from the database DB and the like, and the i challenges may be selected from the list to be inputted into the DB.

Then, step S3 includes: reading j' responses corresponding to the respective i challenges inputted in step S2 from the database DB to concatenate them; and further concatenating the concatenated data by k' repetitions to concatenate obtained (j'×k') responses for each challenge for i different challenges and thereby generate fourth reference data including (i×j'×k') responses.

Next, step S4 includes: inputting the above i challenges, k times, for each challenge into the PUF mounted chip IC; leaving obtained k responses intact as k'=k or processing them into k' pieces (0<k'<k) (specifically, for example, k pieces are divided into k' subsets, and the most frequent value of values on each axis of the responses (if there are a plurality of most frequent values, any one of them) within each subset is set as the value on that axis of the response representing that subset) to concatenate each response of the obtained k' pieces by j' repetitions; and further concatenating k' sets of them to obtain (j'×k') responses for each challenge. Furthermore, concatenating them for different responses causes the fourth synthesized output data including (i×j'×k') responses to be generated.

Then, step S5 includes: deciding whether or not the fourth synthesized output data is similar to the fourth reference data (specifically, whether or not the Hamming distance between both data is equal to or smaller than a threshold value); proceeding to step S6 to judge that the PUF mounted chip IC is real if the similarity is decided; and proceeding to step S7 to judge that the PUF mounted chip IC is false if no similarity is decided.

According to the authenticity deciding method according to the fourth embodiment as described above, changing the values of the i, j, j', k, and k' allows the error rate in the decision in step S5 to be controlled.

Then, since the i, j, j', k, and k' can be set as five independent parameters, the error rate can be controlled with higher accuracy.

In addition, in the same manner as described above, the fourth synthesized output data generated by the present method can also be used as a cryptographic key and the original data for generating it.

It should be noted that, in the authenticity deciding method according to the fourth embodiment, it is necessary to register the (i×j) responses in the database DB, but if such (i×j) responses are compressed into information indicating mutually different parts to be stored in the database DB, the scale of the required database DB can be reduced.

Figure 7:
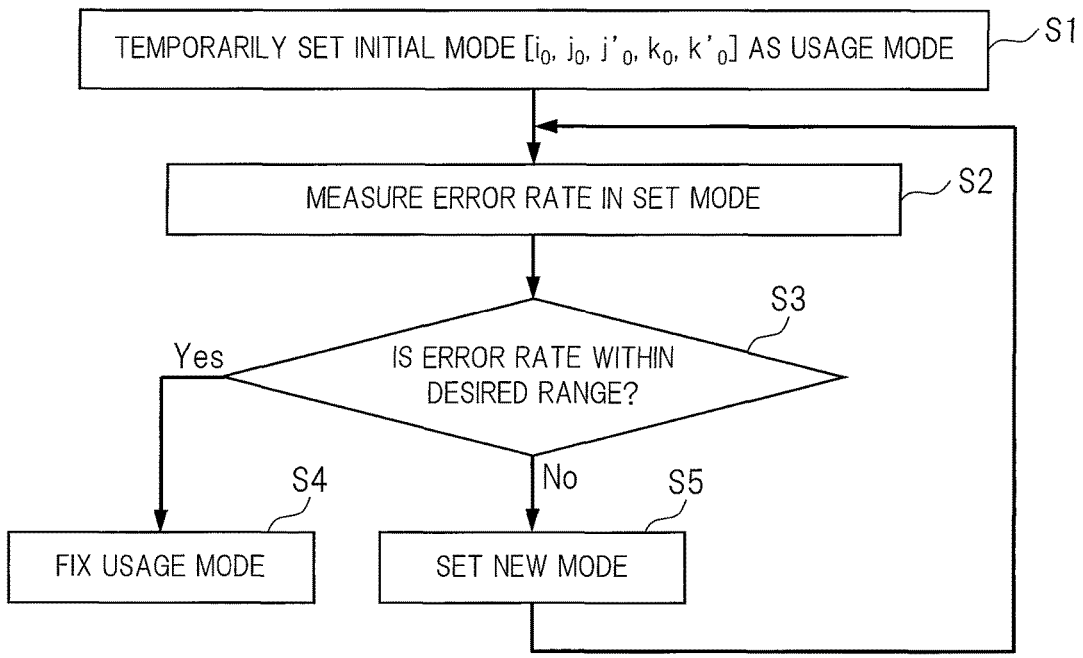
FIG. 7 is a flowchart showing a fixing method of a usage mode according to an embodiment of the present invention.

In the above description, the four usage modes of the [1, 1, 1, k, k'] mode, the [1, j, j', 1, 1] mode, the [1, j, j', k, k'] mode, and the [i, j, j', k, k'] mode are sequentially described. In the following, however, a method of fixing the usage mode will be described with reference to FIG. 7.

First, step S1 includes temporarily setting an initial mode [$i_0$, $j_0$, $j'_0$, $k_0$, $k'_0$] as a usage mode.

Next, step S2 includes measuring the error rate in the set usage mode.

Next, step S3 includes deciding whether or not the error rate measured in step S2 is within a desired range. Then, if the error rate is decided to be within the desired range, the process proceeds to step S4 to fix the usage mode, and if the error rate is decided not to be within the desired range, a new usage mode is set in step S5 and the process returns to step S2.

By this method, a usage mode in which the error rate falls within a desired range can be fixed.

As described above, the error rate can be controlled by arbitrary setting of i, j, j', k, and k', but the error rate can also be controlled by change of the challenges.

Figure 8:
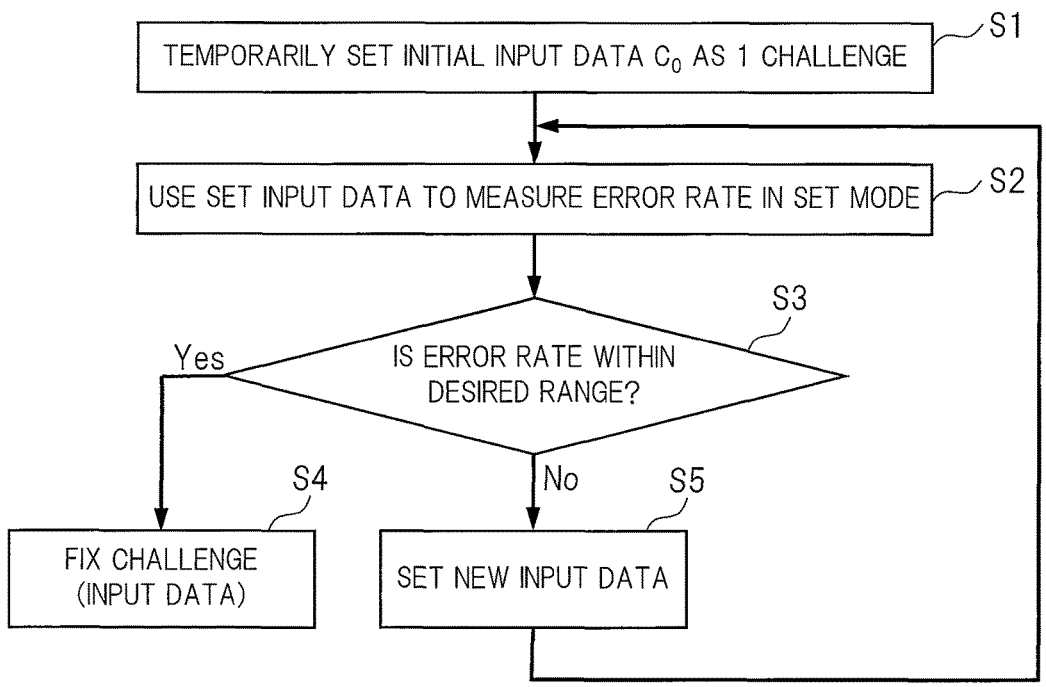
FIG. 8 is a flowchart showing a fixing method of a challenge (input data) according to an embodiment of the present invention.

Here, the fixing method of challenges will be described with reference to FIG. 8.

First, step S1 includes temporarily setting initial input data $C_0$ as 1 challenge.

Next, step S2 includes measuring the error rate in the set mode by using the set input data.

Next, step S3 includes deciding whether or not the error rate measured in step S2 is within a desired range. Then, if the error rate is decided to be within the desired range, the process proceeds to step S4 to fix the challenge (input data), and if the error rate is decided not to be within the desired range, a new input data is set in step S5 and the process returns to step S2.

By this method, the challenge in which the error rate falls within the desired range can be fixed.

The method for controlling the error rate of the device-specific information according to the embodiment of the present invention as described above can be applied to the following application fields.

First, the method is useful for not only the authenticity decision of the PUF mounted chip IC but also for the prevention of forgery due to the present decision. According to the method for controlling the error rate of the device-specific information according to the above embodiments, since the authentication error rate can be controlled even after the manufacture of the chip, the authentication error rate can also be changed depending on the aged deterioration of the chip. In addition, while the PUF of the same standard is being used, the error rate can be changed dynamically depending on the application of the chip and the like.

Then, since the chip is made a RFID (radio frequency identifier) and pasted, the authenticity decision of medicines, foods, luxury brand products, and the like can be also achieved.

In addition, sharing confidential information such as cryptographic keys with no error between two parties allows concealment of information on a communication path(s) and a secure authentication system to be achieved. Accordingly, for example, secure electronic payment, entrance/exit management, protection of multimedia contents, and the like can be achieved using IC cards.

In addition, the method for controlling the error rate of the above device-specific information can be achieved also by describing algorithms shown in FIGS. 1, 3, 5 to 8 showing the method in a computer program and by causing a computer(s) to execute the described program (program for controlling the error rate of device-specific information).

From the above, according to the method for controlling the error rate of device-specific information and the program for controlling the error rate of device-specific information according to the embodiment of the present invention, since the error rate can be controlled after the manufacture of the chip, it is unnecessary to individually design and manufacture the chip having a target error rate for each application.

From this, it is possible to achieve an identity authentication system, an authenticity deciding system, or cryptographic key generation having a desired error rate while suppressing the manufacturing cost of the chip.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A method for controlling an error rate of device-specific information, the method comprising:
a first step of: inputting each of i (i is an arbitrary natural number) pieces of input data, j times (j is an arbitrary natural number), into a physically unclonable circuit; processing j responses into j' pieces (j' is an arbitrary natural number, and $0<j'\le j$); and storing them in a storage means beforehand in association with each piece of the input data;
a second step of: inputting the i pieces of the input data into the storage means;
reading the j' responses corresponding to the respective i pieces of the input data from the storage means to concatenate the obtained j' responses for each piece of the input data;
further concatenating the concatenated data by k' repetitions (k' is an arbitrary natural number and $0<k'\le k$, where k is an arbitrary natural number, and k is 2 or more when the i and the j are both 1); and further concatenating the obtained data for i pieces for different input data to generate reference data;
a third step of: inputting the i pieces of the input data, k times, for each piece of the input data into the physically unclonable circuit; processing the obtained k responses into k' pieces to concatenate each of the obtained k' pieces of the responses by j' repetitions;
further concatenating the j' responses for all of the k' pieces to obtain (j'×k') responses for each piece of the input data; and further concatenating the (j'×k') responses for each piece of the input data also for different input data; and generating synthesized output data including (i×j'×k') responses;
a fourth step of deciding whether or not the synthesized output data is in a same range as the reference data; and
a fifth step of determining whether or not an error rate of the synthesized output data is within a preset range as a result of the decision in the fourth step,
wherein if the error rate is determined not to be within the preset range in the fifth step, at least one of the i, j, j', k, and k' is changed to repeat the first through fifth steps until the error rate falls within the preset range; and
wherein if the j' is a natural number of 2 or more in the first step, the j' responses are compressed into information indicating parts different from each other to be stored in the storage means.

2. The method for controlling an error rate of device-specific information according to claim 1, wherein only any one or two of the i, j, and k are a constant 1.

3. A method for controlling an error rate of device-specific information, the method comprising:
a first step of initially setting input data into a physically unclonable circuit;
a second step of: inputting each of i (i is an arbitrary natural number) pieces of the initially set input data, j times (j is an arbitrary natural number), into the physically unclonable circuit; processing j responses into j' pieces (j' is an arbitrary natural number, and $0<j'\le j$); and storing them in a storage means beforehand in association with each piece of the input data;
a third step of: inputting the i pieces of input data into the storage means; reading the j' responses corresponding to the respective i pieces of the input data from the storage means to concatenate the j' responses for each piece of the input data; further concatenating the concatenated data by k' repetitions (k' is an arbitrary natural number and $0<k'\le k$, where k is an arbitrary natural number, and k is 2 or more when the i and the j are both 1) to obtain the (j'×k') responses concatenated for each piece of the input data; and further concatenating the obtained responses also for different input data to obtain (i×j'×k') concatenated responses and thereby generate reference data;
a fourth step of: inputting the i pieces of input data, k times, for each piece of the input data into the physically unclonable circuit; processing the obtained k responses into k' pieces; concatenating the obtained k' responses by j' repetitions for each of the responses; further concatenating them for all of the k' pieces; further concatenating the concatenated (j'×k') responses also for different input data; and obtaining concatenated (i×j'×k') responses to generate synthesized output data;
a fifth step of deciding whether or not the synthesized output data is in a same range as the reference data; and
a sixth step of determining whether or not an error rate of the synthesized output data is within a preset range as a result of the decision in the fifth step,
wherein if the error rate is determined not to be within the preset range in the sixth step, the input data is changed to repeat the first to sixth steps until the error rate falls within the preset range; and
wherein if the j' is a natural number of 2 or more in the first step, the j' responses are compressed into information indicating parts different from each other to be stored in the storage means.

4. A non-transitory computer readable storage medium having a computer readable program stored thereon for controlling an error rate of device-specific information for causing a computer to perform:
a first procedure of: inputting each of i (i is an arbitrary natural number) pieces of input data, j times (j is an arbitrary natural number), into a physically unclonable circuit; processing j responses into j' pieces (j' is an arbitrary natural number, and $0<j'\le j$); and storing them in a storage means beforehand in association with each piece of the input data;
a second procedure of: inputting the i pieces of input data into the storage means;
reading the j' responses corresponding to the respective i pieces of the input data from the storage means; concatenating the j' responses for each piece of the input data; further concatenating the concatenated data by k' repetitions (k' is an arbitrary natural number and $0 < k' \leq k$, where k is an arbitrary natural number, and k is 2 or more when the i and the j are both 1); obtaining the (j'×k') responses concatenated for each piece of the input data; and further concatenating the obtained responses also for different input data to obtain concatenated (i×j'×k') responses and thereby generate reference data;

a third procedure of: inputting the i pieces of input data, k times, for each piece of the input data into the physically unclonable circuit; processing obtained k responses into k' pieces; concatenating the obtained k' responses by j' repetitions for each the responses;

further concatenating them for all of the k' pieces; and further concatenating the concatenated (j'×k') responses also for different input data to obtain concatenated (i×j'×k') responses and thereby generate synthesized output data;

a fourth procedure of deciding whether or not the synthesized output data is in a same range as the reference data;

a fifth procedure of determining whether or not an error rate of the synthesized output data is within a preset range as a result of the decision in the fourth procedure, wherein if the error rate is determined not to be within the preset range in the fifth procedure, at least one of the i, j, j', k, and k' is changed to repeat the first through fifth procedures until the error rate falls within the preset range;

wherein the program is included in a not-temporary computer readable medium; and wherein if the j' is a natural number of 2 or more in the first procedure, the j' responses are compressed into information indicating parts different from each other to be stored in the storage means.

5. The non-transitory computer readable storage medium having the computer readable program stored thereon for controlling an error rate of device-specific information according to claim 4, wherein only any one or two of the i, j, and k are a constant 1.

6. A non-transitory computer readable storage medium having a computer readable program stored thereon for controlling an error rate of device-specific information for causing a computer to perform:

a first procedure of initially setting input data into a physically unclonable circuit;

a second procedure of: inputting each of i pieces (i is an arbitrary natural number) of the initially set input data, j times (j is an arbitrary natural number), into the physically unclonable circuit; processing j responses into j' pieces (j' is an arbitrary natural number, and $0 < j' \leq j$); and storing them in a storage means beforehand in association with each piece of the input data;

a third procedure of: inputting the i pieces of input data into the storage means; reading j' responses corresponding to the respective i pieces of the input data from the storage means; concatenating the j' responses for each piece of the input data; further concatenating the concatenated data by k' repetitions (k' is an arbitrary natural number and $0 < k' \leq k$, where k is an arbitrary natural number, and k is 2 or more when the i and the j are both 1); obtaining the concatenated (j'×k') responses for each piece of the input data; and further concatenating the obtained responses also for different input data to obtain concatenated (i×j'×k') responses and thereby generate reference data;

a fourth procedure of: inputting the i pieces of input data, k times, for each piece of the input data into the physically unclonable circuit; processing obtained k responses into k' pieces; concatenating obtained k' responses by j' repetitions for each of the responses; further concatenating them for all of the k' pieces; further concatenating the concatenated (j'×k') responses also for different input data; and obtaining concatenated (i×j'×k') responses so as to generate synthesized output data;

a fifth procedure of deciding whether or not the synthesized output data is in a same range as the reference data; and a sixth procedure of determining whether or not an error rate of the synthesized output data is within a preset range as a result of the decision in the fifth procedure, wherein if the error rate is determined not to be within the preset range in the sixth procedure, the input data is changed to repeat the first to sixth procedures until the error rate falls within the preset range;

wherein the program is included in a not-temporary computer readable medium; and wherein if the j' is a natural number of 2 or more in the first procedure, the j' responses are compressed into information indicating parts different from each other to be stored in the storage means.

7. A method for controlling an error rate of device-specific information, the method comprising:

a first step of: inputting each of i (i is an arbitrary natural number) pieces of input data, j times (j is an arbitrary natural number), into a physically unclonable circuit;

processing j responses into j' pieces (j' is an arbitrary natural number, and $0 < j' \leq j$); and storing them in a storage means beforehand in association with each piece of the input data;

a second step of: inputting the i pieces of the input data into the storage means;

reading the j' responses corresponding to the respective i pieces of the input data from the storage means to concatenate the obtained j' responses for each piece of the input data;

further concatenating the concatenated data by k' repetitions (k' is an arbitrary natural number and $0 < k' \leq k$, where k is an arbitrary natural number, and k is 2 or more when the i and the j are both 1); and further concatenating the obtained data for i pieces for different input data to generate reference data;

a third step of: inputting the i pieces of the input data, k times, for each piece of the input data into the physically unclonable circuit; processing the obtained k responses into k' pieces to concatenate each of the obtained k' pieces of the responses by j' repetitions; further concatenating the j' responses for all of the k' pieces to obtain (j'×k') responses for each piece of the input data; and further concatenating the (j'×k') responses for each piece of the input data also for different input data; and generating synthesized output data including (i×j'×k') responses;

a fourth step of deciding whether or not the synthesized output data is in a same range as the reference data; and a fifth step of determining whether or not an error rate of the synthesized output data is within a preset range as a result of the decision in the fourth step, wherein if the error rate is determined not to be within the preset range in the fifth step, at least one of the i, j, j', k, and k' is changed to repeat the first through fifth steps until the error rate falls within the preset range, and only any one or two of the i, j, and k are a constant 1.

8. A non-transitory computer readable storage medium having a computer readable program stored thereon for controlling an error rate of device-specific information for causing a computer to perform:

a first procedure of: inputting each of i (i is an arbitrary natural number) pieces of input data, j times (j is an arbitrary natural number), into a physically unclonable circuit; processing j responses into j' pieces (j' is an arbitrary natural number, and $0<j'\leq j$); and storing them in a storage means beforehand in association with each piece of the input data;

a second procedure of: inputting the i pieces of input data into the storage means; reading the j' responses corresponding to the respective i pieces of the input data from the storage means; concatenating the j' responses for each piece of the input data; further concatenating the concatenated data by k' repetitions (k' is an arbitrary natural number and $0<k'\leq k$, where k is an arbitrary natural number, and k is 2 or more when the i and the j are both 1); obtaining the (j'×k') responses concatenated for each piece of the input data; and further concatenating the obtained responses also for different input data to obtain concatenated (i×j'×k') responses and thereby generate reference data;

a third procedure of: inputting the i pieces of input data, k times, for each piece of the input data into the physically unclonable circuit; processing obtained k responses into k' pieces; concatenating the obtained k' responses by j' repetitions for each the responses; further concatenating them for all of the k' pieces; and further concatenating the concatenated (j'×k') responses also for different input data to obtain concatenated (i×j'×k') responses and thereby generate synthesized output data;

a fourth procedure of deciding whether or not the synthesized output data is in a same range as the reference data; and a fifth procedure of determining whether or not an error rate of the synthesized output data is within a preset range as a result of the decision in the fourth procedure, wherein if the error rate is determined not to be within the preset range in the fifth procedure, at least one of the i, j, j', k, and k' is changed to repeat the first through fifth procedures until the error rate falls within the preset range, only any one or two of the i, j, and k are a constant 1; and wherein the program is included in a not-temporary computer readable medium.

* * * * *